March 20, 1973 F. R. PREDIGER ET AL 3,721,228
DEVICE FOR THE EVALUATION OF DECONGESTANT DRUGS
Filed May 14, 1971 3 Sheets-Sheet 1
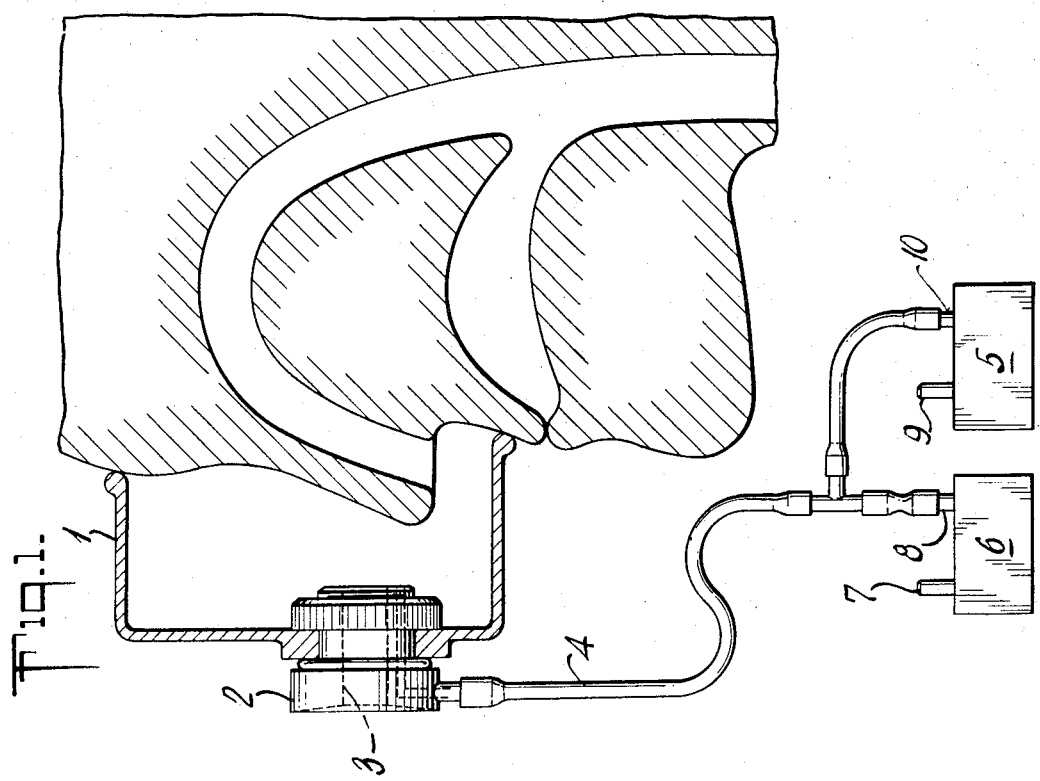
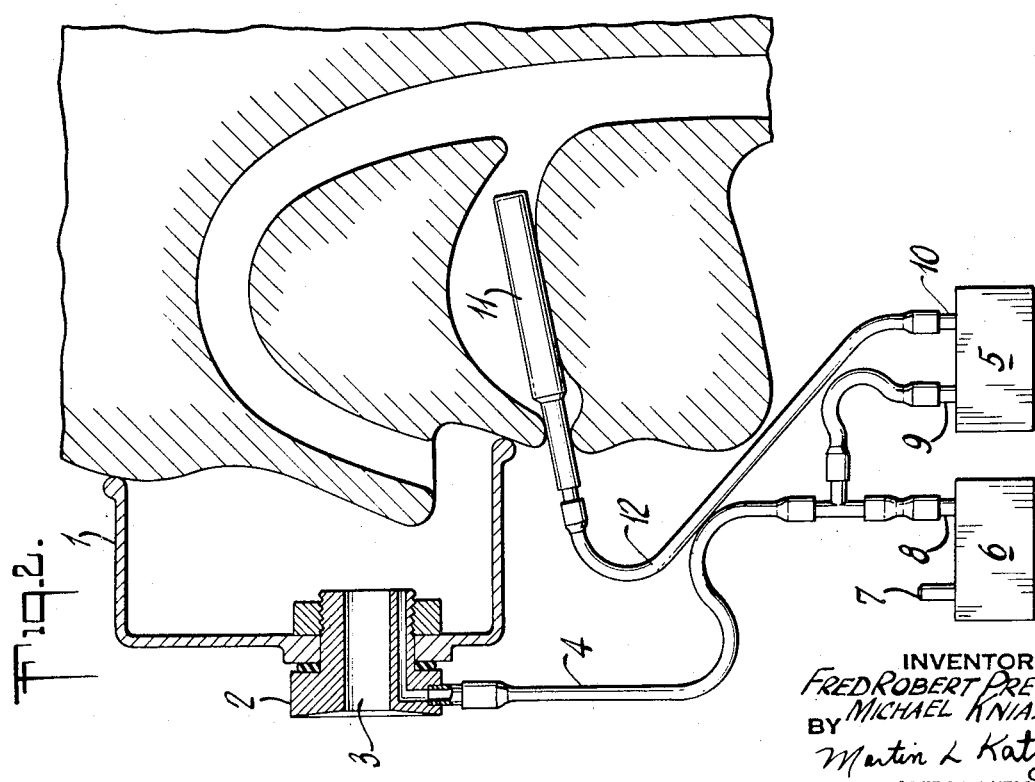
INVENTORS
FRED ROBERT PREDIGER
MICHAEL KNIAZUK
BY
Martin L Katz
ATTORNEY

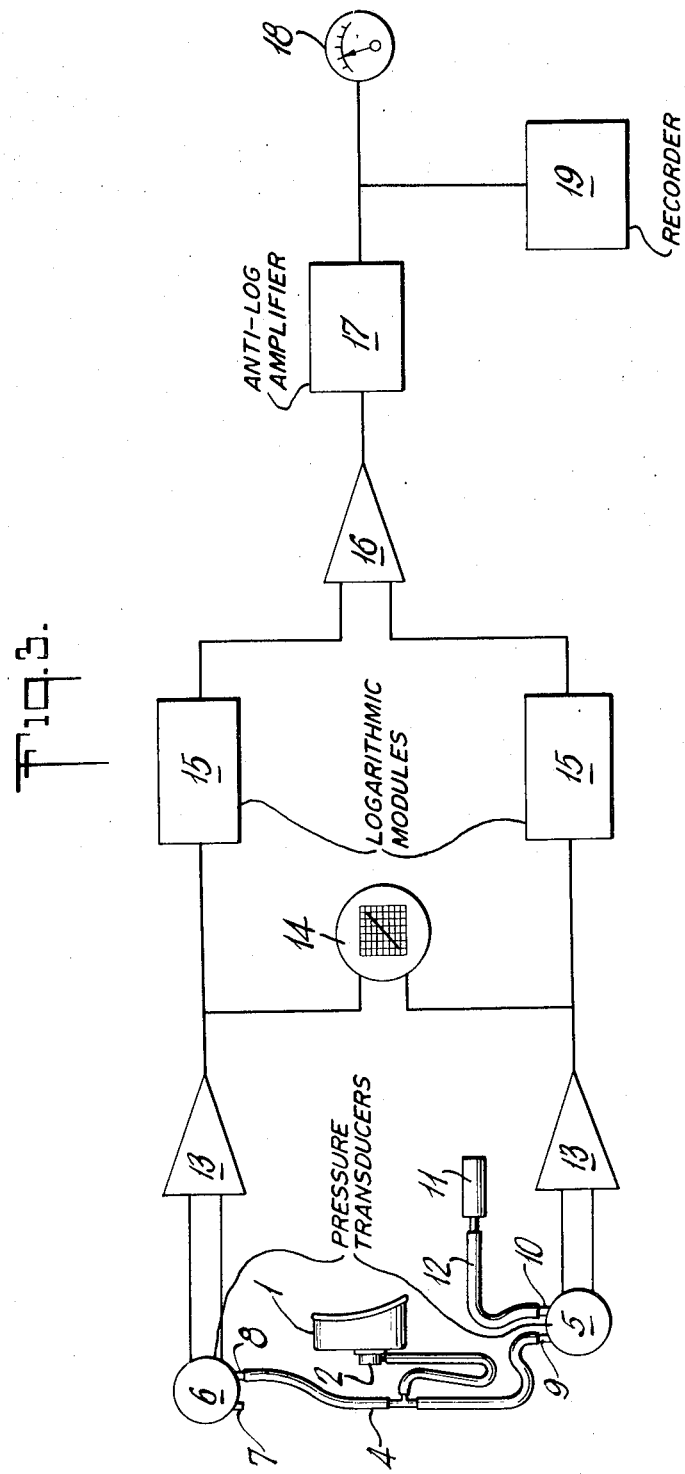

United States Patent Office 3,721,228
Patented Mar. 20, 1973

3,721,228
DEVICE FOR THE EVALUATION OF DECONGESTANT DRUGS
Fred Robert Prediger, Westfield, and Michael Kniazuk, Mountainside, N.J., assignors to Merck & Co., Inc., Rahway, N.J.
Filed May 14, 1971, Ser. No. 143,512
Int. Cl. A61b 5/00
U.S. Cl. 128—2 R            3 Claims

ABSTRACT OF THE DISCLOSURE

Device for measuring pharyngeal pressure and nasal airflow in order to evaluate the effectiveness of decongestant drugs in which a conventional circular orifice is inserted into a face mask. As a patient breathes through this orifice, with accompanying pharyngeal tube passing between his lips, the pressure-flow relationships between the nose and mask orifice are continuously compared by a specifically designed analog computer. For simplicity of clinical work, the recorded comparison signal can represent a percentage of, or an area relative to, that of the standard mask orifice. For precise calculations, the answer may be converted to absolute units of flow (liters/sec.) and pressure (cm. $H_2O$) after absolute calibration of the particular face mask orifice employed.

---

This invention relates to an improved device for measuring pharyngeal pressure and nasal airflow in order to evaluate the effectiveness of decongestant drugs.

More particularly, this invention relates to an improved device for evaluating the effectiveness of decongestant drugs in which pharyngeal pressure is measured by passing a plastic tube between the patient's closed lips and relative nasal air flow is measured by means of a circular orifice pneumotachograph in a face mask. As a patient breathes, the device of this invention measures the ratio of these two continuously varying pressures by means of an analog computer, thereby indicating an area relative to that of the standard orifice in the mask.

In the past, two basic procedures and devices have been used to measure nasal airways and evaluate decongestant drugs. A first procedure has been used which measures the pressure drop developed by the nasal airways with a fixed arbitrary gas flow by the use of a pressure or vacuum system. A second procedure has been used which utilizes the varying air flow produced by body respiration for the measurement of the pressure drop developed by the nasal airways. The most recent method used entails the simultaneous measurement of pharyngeal pressure and air flow which is measured by a clinical pneumotachograph, and the resultant presentation of this data as an X-Y plot on an oscilloscope via the use of electromechanical transducers. With the Y axis used for nasal air flow and the X axis for pharyngeal pressure, the pattern obtained is an "S" curve, the varying slope of which is proportional to nasal conductance or reciprocal nasal resistance. Since the slope is continuously changing, the accepted procedure is to make comparison at some arbitrary flow value, by approximating tangents with a mechanical device on the oscilloscope face.

Accordingly, it is an object of this invention to provide an instrument for measuring the effectiveness of decongestant drugs by directly measuring the nasal airflow-pharyngeal pressure ratio which is constant throughout the entire physiological breathing range of the patient, for each associated effective nasal area.

It is a further object of this invention to provide a device for precisely measuring relative nasal airways so that decongestant drugs may be accurately evaluated.

These and other objects of this invention will be better understood by an examination of the accompanying specification and drawings in which:

FIG. 1 is a sectional view of the device of this invention in position to be calibrated prior to use in clinical analysis;

FIG. 2 is a sectional view of the device of this invention being used to clinically evaluate the effectiveness of a decongestant drug;

FIG. 3 is a block diagram of the component parts of the device of this invention;

Figure 4:
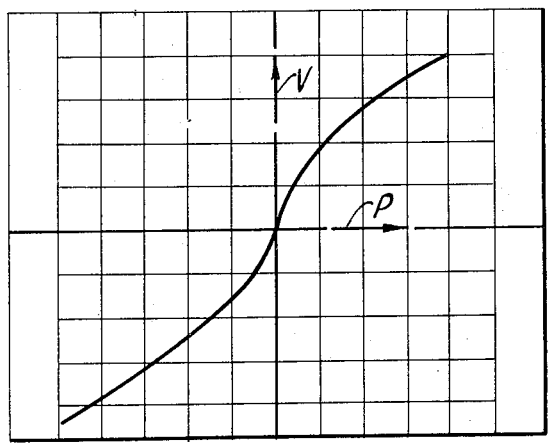
FIG. 4 is a response curve as presented on an oscilloscope for a typical prior art device wherein the Y axis represents nasal airflow and the X axis represents pharyngeal pressure.

Referring more particularly to the drawings, FIG. 1 illustrates the device of this invention being calibrated for accurate use in the clinical analysis of a decongestant drug. In this state, the device comprises a pneumotachograph-face mask 1 having an orifice pneumotachograph 2 which has a round hole 3 with a cross sectional area of 100 square millimeters. The mask should be applied airtight but there should not be pressure on the tissue overlying the nasal bones of the patient. When the device of this invention is in the condition shown in FIG. 1, the pressure within the mask 1 near the round hole 3 is transmitted by means of a piece of flexible rubber tubing 4 to terminals 8 and 10 of Statham (PM-5) differential pressure transducers 5 and 6. Each of these transducers has a terminal 7 and 9 which is open to the atmosphere. In this way the instrument is calibrated by arranging the tubing as indicated in FIG. 1 and adjusting the relative gains of the amplifiers so that output meter and/or recorder read 100, indicating 100 sq. mm. relative area, or 100% relative resistance to the standard orifice in the face mask.

FIG. 2 illustrates the device of this invention being used to evaluate a decongestant drug. In this figure a mouthpiece 11 is connected to the pressure transducer 5 by means of tube 12 and tube 4 is connected to terminals 8 and 9 while terminal 7 remains open to the atmosphere. In this manner, both nasal airflow and pharyngeal pressure may be accurately measured.

The effectiveness of a decongestant drug may be accurately evaluated by the use of the device of this invention in view of the following mathematical principles which may be applied to the measurement of the nasal passages. The transnasal pressure drop $P_n$ varies directly as the square of the nasal air velocity $V_n$. If a relative cross sectional area $A_n$ is assigned to the nasal passages, then the nasal air velocity $V_n$ is equal to the quantity of air going through the nasal air passages per unit time $Q_n$ divided by the relative cross sectional area $A_n$. Accordingly, the transnasal pressure drop $P_n$ varies directly as the square of the quantity of air going through the nasal air passages per unit time $Q_n$ divided by the square of the relative cross sectional area $A_n$ of the nasal passages. The transnasal pressure drop $P_n$ is measured by transducer 5 when the device is in the position shown in FIG. 2. The pressure drop $P_t$ across orifice 3 is measured by transducer 6 and varies directly as the square of the volume flow per unit time $Q_t$. Therefore, it may be readily seen, by one skilled in the art, that the relative cross sectional area $A_n$ of the nasal passages varies directly as the square root of the pressure drop $P_t$ across orifice 3 divided by the transnasal pressure drop $P_n$. The following equations illustrate the above principles:

(1) $P_n \alpha V_n^2$
(2) $V_n = Q_n/A_n$
(3) $P_n \alpha Q_n^2/A_n^2$
(4) $P_t \alpha Q_t^2$, since the mask orifice remains fixed at 100 sq. mm. at all times.
(5) $Q_n = Q_t$ Solving Equation 3 for $A_n$ and substituting from (4) and (5) yields the following:

(6) $$A \alpha \sqrt{P_t/P_n}$$

$P_t$ and $P_n$ may be determined from the readings of transducers 6 and 5 respectively.

From the above principles, it may be readily seen that the effectiveness of a decongestant drug varies directly as the value of the equivalent cross sectional area of the nasal passages.

In practice, a decongestant drug may be evaluated by calculating the effective nasal area of a patient prior to the administration of the drug being evaluated and at regular intervals after such administration. This data can be statistically evaluated and compared with similar data for other drugs or placebos.

FIG. 3 illustrates in block diagram form the measurement, calculation and output components of the device of this invention. As the patient breathes through his mouth, the mouthpiece 11 transmits a reading through tube 12 to transducer 5. A reading is also taken from face mask 1 and is transmitted through tube 4 to transducer 5, wherein the transnasal pressure drop is determined. Pressure readings are also taken across orifice 3 by taking a reading inside the face mask relative to atmospheric pressure. These readings are transmitted to transducer 6 through terminals 7 and 8 where the pressure drop across orifice 3 is determined. These readings are each then fed to two operational amplifiers 13 (analog No. 118), which amplify these values to approximately 10 volts at peak value of input, and more normally, 6–7 volts for normal subjects and conditions. These amplifiers drive a monitoring oscilloscope 14 and two logarithmic modulus 15 (Philbrick No. 4350). Amplifier 16 (analog No. 118) feeds the difference of the logs into an anti-log amplifier 17 (Philbrick No. 4350) having half the sensitivity of the log module. The output of the anti-log module 17 drives a meter 18 and a recorder 19. This equipment performs and records the following operation:

$$\text{Relative nasal area} = \log^{-1}\left[\frac{\log P_t - \log P_n}{2}\right]$$

FIG. 4 illustrates a response curve for a typical prior art device wherein the Y axis represents nasal airflow and the X axis represents pharyngeal pressure. The curve produced by the prior art device is an "S" curve. The slope at any given point is continuously changing, and the accepted procedure in evaluating a decongestant drug with a device of this type is to make comparisons at some arbitrarily selected point on the curve by approximating tangents with a mechanical device on the oscilloscope face. In this manner, the various slopes can be compared to evaluate the decongestant drug.

Figure 5:
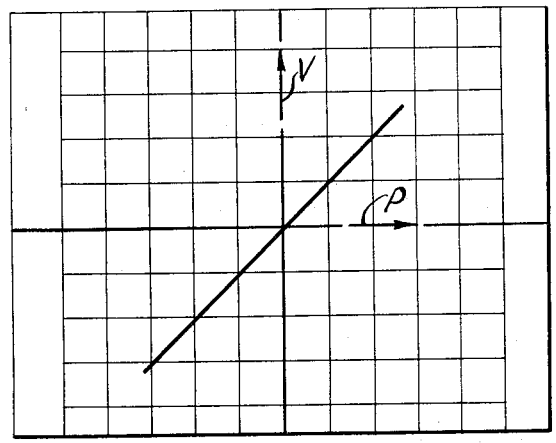
FIG. 5 is a response curve as presented on an oscilloscope for the device of this invention wherein the Y axis represents the nasal airflow squared and the X axis rperesents pharyngeal pressure.

FIG. 5 is a straight line response for the device of this invention wherein the Y axis represents nasal airflow squared and the X axis represents pharyngeal pressure. A decongestant drug may be accurately evaluated by measuring the slope of this straight line response. A comparison of the changing slope of the straight line response over a period of time will give a trained observer sufficient information to evaluate the effectiveness of one or more decongestant drugs. One skilled in the art will readily appreciate that much more accurate comparisons can be obtained by the measurement of the slope of a straight line response than by the approximation of the slope at an arbitrarily selected point on an "S"-type response curve.

What is claimed is:

1. A device for the evaluation of the effect of nasal decongestant drugs which comprises a face mask for application to the area surrounding the nose of a patient's face, said face mask having a flat rear portion and a side wall perpendicular to and surrounding the edge of said rear portion, an orifice pneumotachograph disposed in the center of the rear portion of said face mask, a round hole in the center of said orifice pneumotachograph, said hole extending from the interior of the face mask to the atmosphere, a fitting on the rear portion of said face mask, a mouthpiece for insertion in the patient's mouth, a pressure transducer, a length of flexible tubing, said tubing connecting the fitting in the rear wall of the face mask to said pressure transducer so that the pressure differential across said orifice with a patient being tested may be determined, a second pressure transducer and a second length of flexible tubing, said second length of flexible tubing connecting both the fitting in the rear wall of the face mask and the mouth piece to the second pressure transducer so that the transnasal pressure drop of a patient being tested may be determined, voltage amplifiers connected to each of said transducers, an oscilloscope connected to the amplifiers so that the response of the patient being tested may be plotted and evaluated, a logarithmic module connected to each of said amplifiers to convert the pressure differential to its logarithmic function, and an anti-log amplifier into which the output of said log modules is fed in order to determine the effective nasal area of the patient being tested.

2. A device as in claim 1 further comprising a meter connected to the anti-log amplifier which indicates the effective nasal area for each breath cycle of the patient being tested.

3. A device as in claim 1 further comprising a recording device connected to the anti-log amplifier which records the effective nasal area for each breath cycle of the patient being tested.

References Cited
UNITED STATES PATENTS 3,410,264   11/168   Frederik _____ 128—2.08

WILLIAM E. KAMM, Primary Examiner

U.S. Cl. X.R.

128—2.08